Oct. 5, 1965     G. BERTOGLIO ETAL     3,209,453
PROCESS FOR THE COLD ROUGH SHAPING OF BALL PEN POINTS
Filed June 20, 1961
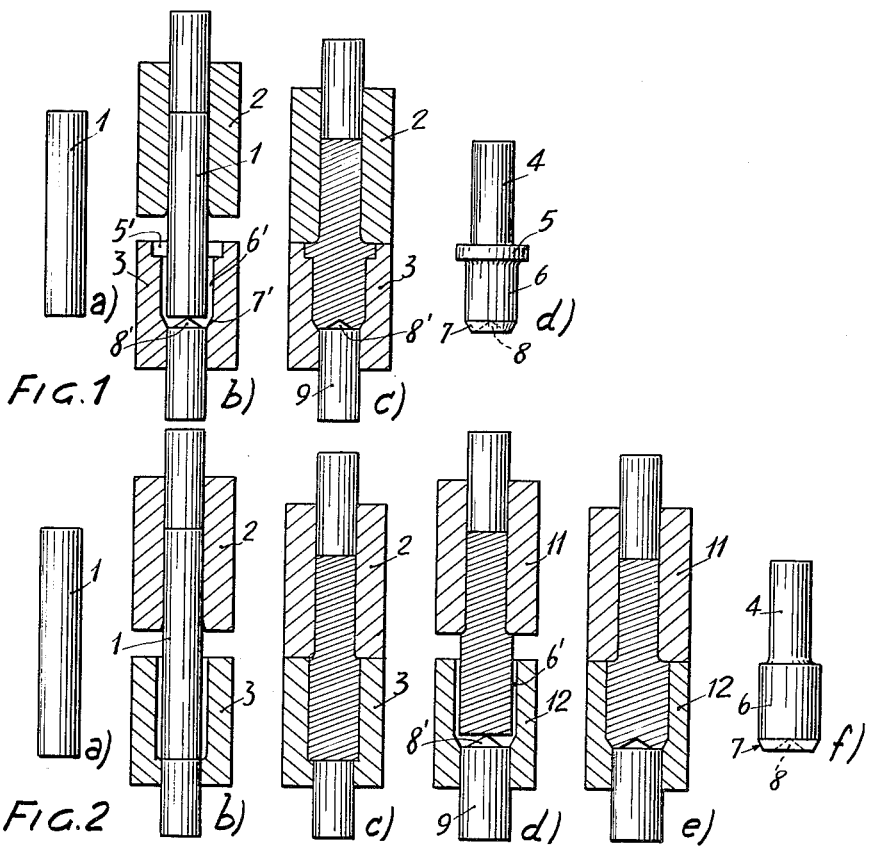
INVENTORS
GUIDO BERTOGLIO
SAURE ALBERTINI
BY     MAXWELL E. SPARROW
ATTORNEY

United States Patent Office 3,209,453
Patented Oct. 5, 1965

3,209,453
PROCESS FOR THE COLD ROUGH SHAPING OF BALL PEN POINTS
Guido Bertoglio and Sauro Albertini, Lugano-Viganello, Switzerland, assignors to Real Patentauswertungs Anstalt, Vaduz, Liechtenstein
Filed June 20, 1961, Ser. No. 118,422
Claims priority, application Switzerland, June 22, 1960, 7,102/60
1 Claim. (Cl. 72—354)

The present invention relates to a process for the cold rough shaping of ball pen points to be subjected to successive machining operations whereby a minimum amount of material is to be removed by means of cutting tools.

The present invention also relates to the shaped ball pen points obtained with the above mentioned process.

The process is characterized in that a small cylindrical workpiece is used as starting element to manufacture each point, said cylindrical workpiece having a diameter corresponding to the smaller, respectively intermediate, respectively larger diameter of the shaped piece to be obtained and in that said cylindrical workpiece is subjected to pressing stages by means of dies thus obtaining by upsetting or respectively by reducing the remaining diameter or diameters, whereby the cylindrical workpiece is further completed with possible short chamfered ends, centering portions and the like to facilitate the successive machining and finishing operations.

The accompanying drawings show by way of example only two different ways of carrying into effect the process according to the invention.

FIG. 1 (stages a–b–c–d) shows the first way according to which starting from a cylindrical workpiece having a diameter corresponding to the smaller diameter of the final rough shaped piece said finished piece is directly obtained in a single phase by means of dies effecting the enlargement of some portions of said piece.

FIG. 2 (stages a–b–c–d–e–f) shows how it is possible starting from a cylindrical workpiece of smaller diameter to obtain through successive pressing stages a shaped piece having a form different from the preceding one.

With reference to FIG. 1 a cylindrical workpiece 1 (FIG. 1a) generally of brass having a diameter equal to the smaller diameter 4 of the finished rough shaped piece (FIG. 1d) is used as starting element. The pressing operation is directly carried into effect and namely in a single phase by means of the dies 2 and 3 (FIG. 1b–c); said pressing phase is such as to determine an enlargement of the portions 5 and 6 as they may be seen on the finished shaped piece represented in FIG. 1d.

The die 2–3 is provided furthermore with a stem 9 having a pointed portion 8' providing for the formation of the centering cavity 8 in the finished rough shaped piece (FIG. 1d), said centering cavity greatly facilitating the successive machining operations of the axial boring effected by means of suitable tools.

In the case illustrated in FIG. 2 the starting element is a cylindrical workpiece 1 (FIG. 2a) having a diameter corresponding again to the smaller diameter 4 of the finished shaped piece (FIG. 2f). Two successive pressing operations will provide by means of dies 2–3 and 11–12 (FIGS. 2b–c and 2d–e) the enlargement of the portion 6 of the shaped piece (FIG. 2f) and the short chamfered portions 7 as well as the central cavity portion 8 which is again obtained by means of the stem 9 and the relative conical pointed portion 8'.

The number of the successive pressing stages can obviously be varied at will and similarly the form of the various dies may be modified to obtain shaped pieces having the external shape as desired for the different types of ball pen points to be manufactured. All these different modifications are obviously comprised in the broader scope of the present invention.

What is claimed is:

The process of cold shaping a ball pen point blank to be subjected to subsequent machining operations whereby a minimum amount of material is removed by means of cutting tools, comprising the steps of:
subjecting a piece of metal of cylindrical shape corresponding in size to an individual ball pen point, said piece having a diameter corresponding to the outside diameter of said blank, to at least one axial cold pressing operation whereby an enlarged diameter of one portion of one end of said piece is obtained; and impressing simultaneously in one operation a short chamfered portion on said end having said enlarged diameter and a central conical cavity in said end, said cavity facilitating said subsequent machining operations.

References Cited by the Examiner
UNITED STATES PATENTS

| Re. 19,348 | 10/52 | Kaufman | 29—553 X |
|---|---|---|---|
| 2,030,290 | 2/36 | Friedman. | |
| 2,265,839 | 12/41 | Hufferd et al. | |
| 2,667,650 | 2/54 | Friedman | 29—552.4 X |
| 3,009,177 | 11/61 | Carusi et al. | 29—552.4 X |
| 3,031,908 | 5/62 | Lejdegard | 29—553 X |

FOREIGN PATENTS 479,834  1/52  Canada.

OTHER REFERENCES
Metals Handbook ASM, 1961, p. 37.
Machinist, February 11, 1932, pp. 208–211.
Merriman: A Dictionary of Metallury 1958, p. 348.

WHITMORE A. WILTZ, *Primary Examiner.*
NEDWIN BERGER, *Examiner.*